Nov. 28, 1967  H. BOUTILLON  3,354,718
LIQUID METER
Filed Sept. 28, 1965  3 Sheets-Sheet 3
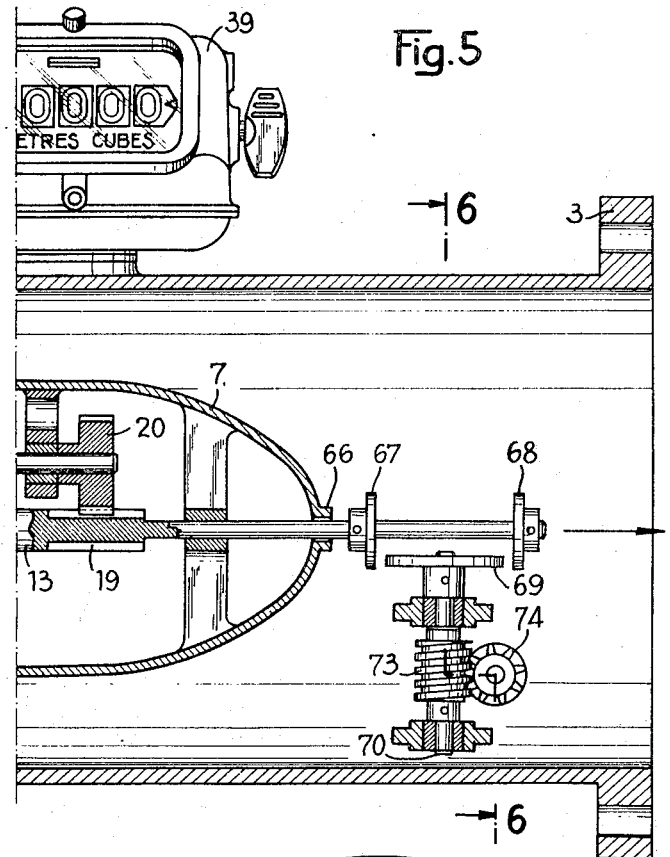
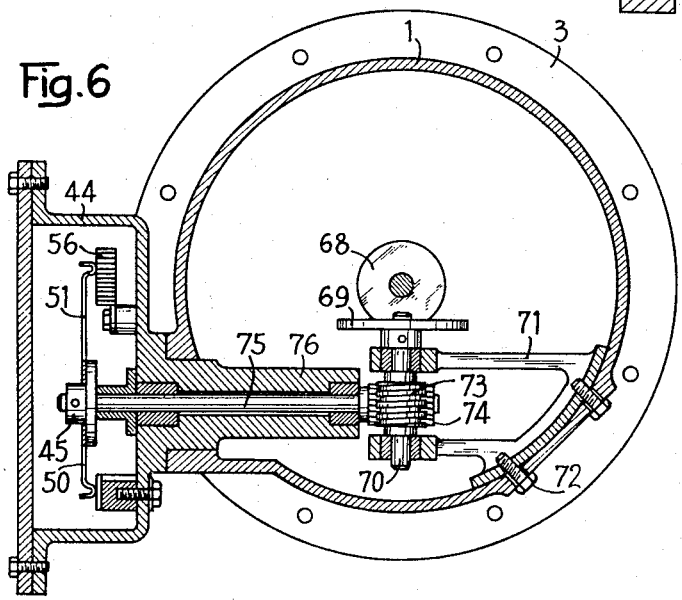

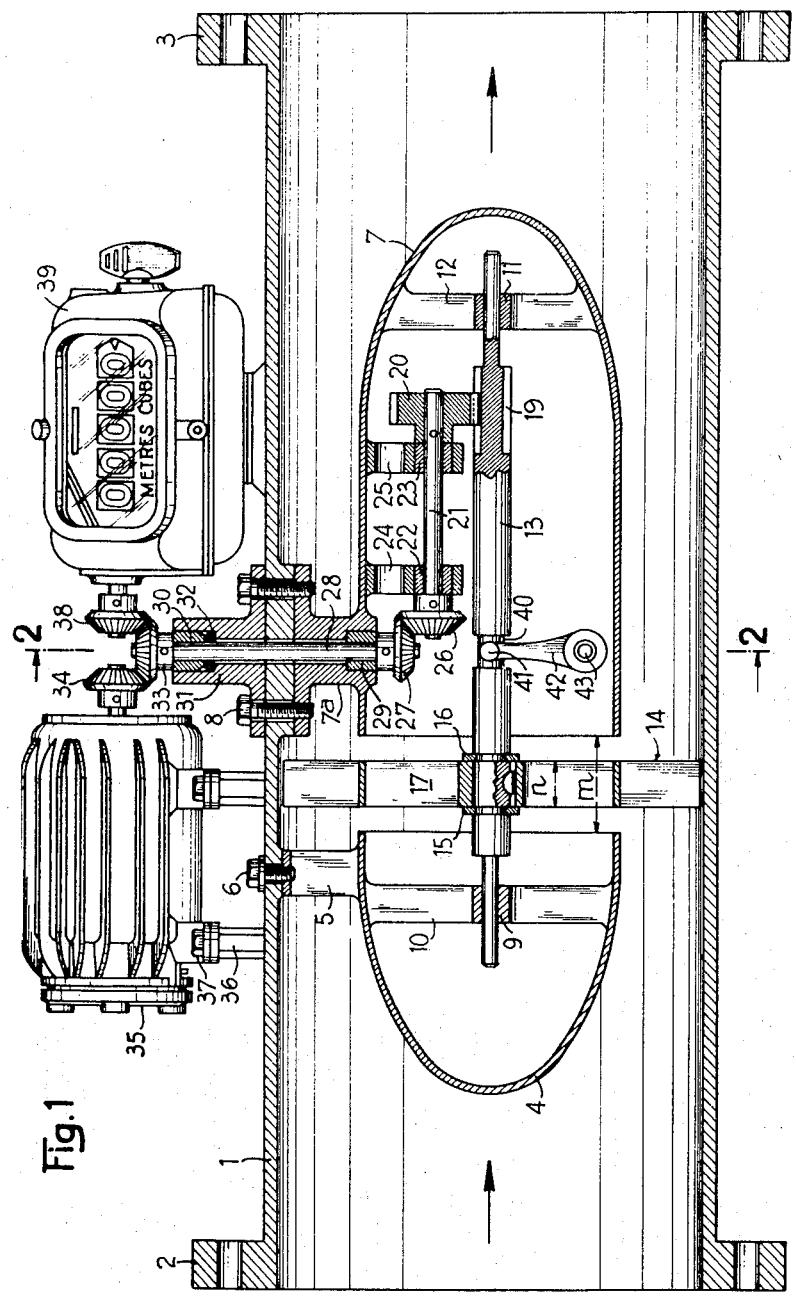

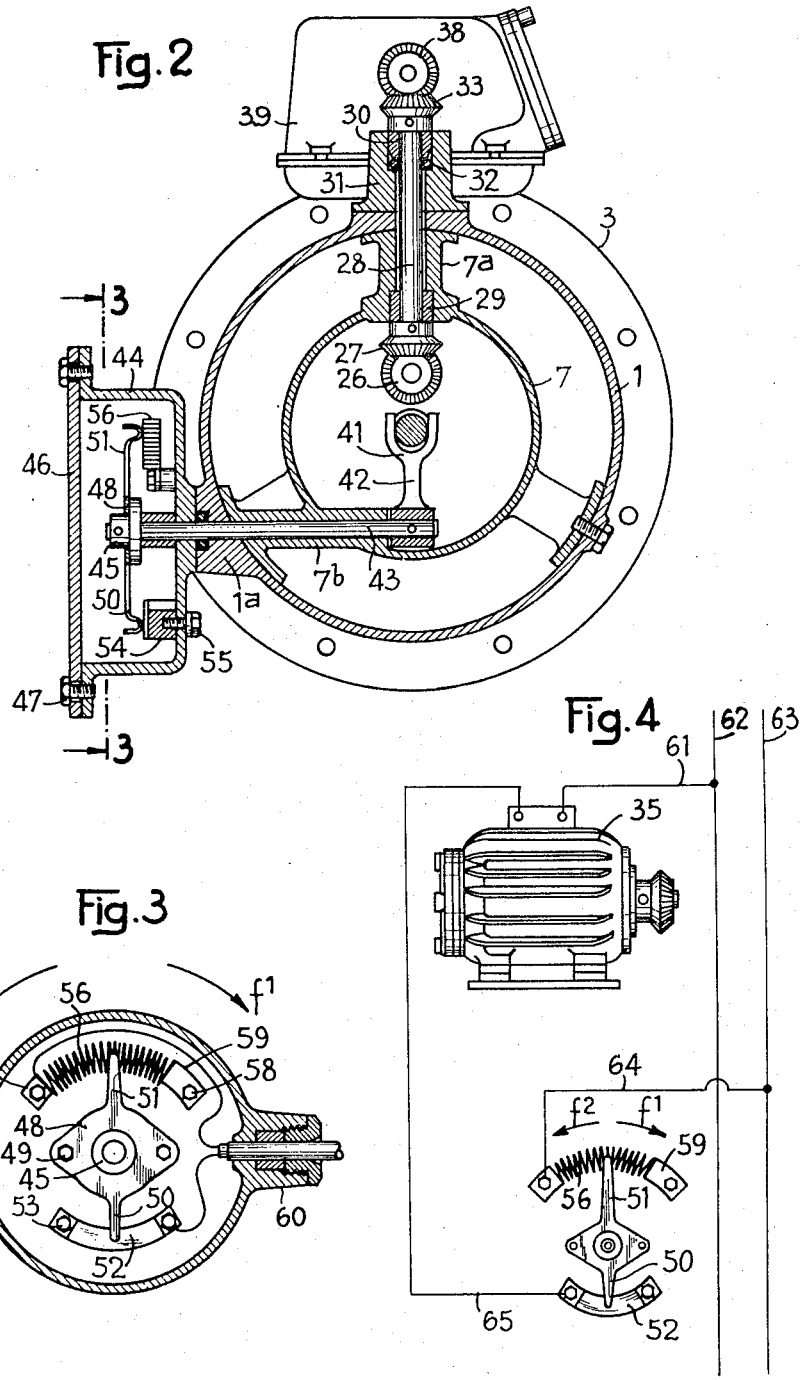

United States Patent Office 3,354,718
Patented Nov. 28, 1967

3,354,718
LIQUID METER
Henri Boutillon, Paris, France, assignor to Etablissements Boutillon S.A., Suresnes, Seine, France, a French body corporate
Filed Sept. 28, 1965, Ser. No. 490,903
Claims priority, application France, Oct. 20, 1964, 991,991
6 Claims. (Cl. 73—230)

ABSTRACT OF THE DISCLOSURE

Liquid meter comprising an axially movable liquid flow measuring screw which is driven in rotation by an auxiliary motor whose speed is controlled by a regulating device, the latter being actuated by the axial movement of the screw in either direction, whereby the screw rotates exactly at the velocity corresponding to the liquid flow.

---

The present invention relates to liquid meters.

Liquid meters are known in which the essential element is a screw or propeller rotated by the movement of the liquid in a conduit. It is obvious that if no resistance opposes the rotation of the screw it will assume a speed, for example expressed as revolutions per second, which is such that the product of this speed multiplied by the pitch of the screw is equal to the axial linear speed of the liquid. Under these ideal conditions, the number of revolutions effected by the screw is exactly proportional to the volume of liquid passing through the screw and it is merely necessary to count this number of revolutions to ascertain the volume of liquid supplied, taking into account the geometric dimensions of the apparatus and the units employed.

However, these ideal conditions cannot be obtained in practice and the rotation of the screw with the counting means it drives consumes an energy which is furnished by the liquid in movement. Consequently, the liquid undergoes a pressure drop in passing through the screw and the speed of rotation of the screw is less than the ideal speed; this results in a noticeable error in the metering.

The object of the present invention is to overcome these two drawbacks and to provide a propeller or screw-type meter in which there is no pressure drop and the rotational speed equals that corresponding to the axial linear speed of the liquid.

The invention provides an improved meter having a screw in which these two objects are attained owing to the provision of a screw which is free to move axially and driven in rotation by an auxiliary motor whose angular velocity is controlled by the axial linear velocity of the liquid by means of a regulating means controlled by the axial displacement of the screw which tends to move in the direction of the flow of the liquid if it does not rotate quick enough or in the direction opposed to said flow if it rotates too quickly.

Further features and advantages of the invention will be apparent from the ensuing description with reference to the accompanying drawings to which the invention is in no way limited.

In the drawings:

FIG. 1 is a diagrammatic axial sectional view of a meter according to the invention;

FIG. 2 is a sectional view taken along line 2—2 of FIG. 1;

FIG. 3 is a sectional view taken along line 3—3 of FIG. 2;

FIG. 4 is a diagram of the electrical connections;

FIG. 5 is a diagrammatic partial axial sectional view of the same meter but in which is shown a variant of the speed regulating control, and FIG. 6 is a sectional view, taken along line 6—6 of FIG. 5, on an enlarged scale.

In the embodiment shown in FIGS. 1–3, a tubular cylindrical body 1 has at one end an inlet flange 2 and at the other end an outlet flange 3. An ogival upstream cowl 4 is fixed in coaxial relation to the body 1 by three arms 5 secured by screws 6. A downstream cowl 7 is fixed coaxially in the body 1 in a similar manner by screws 8.

Located within the upstream cowl 4 is a coaxial bearing 9 carried by arms 10. Located inside the downstream cowl 7 is a coaxial bearing 11 carried by arms 12. A shaft 13 is freely rotatable and slidable at both ends thereof which have a reduced diameter in the bearings 9 and 11. A multi-blade screw or propeller 14 having a constant pitch is keyed on the shaft 13 and also held in position axially of the shaft by two axial abutments 15 and 16.

This screw 14 has an inoperative hub 17 having the same outside diameter as the cowls 4 and 7 and can freely rotate in the body 1 with a slight radial clearance. It is also free to move axially to a certain extent, the gap $m$ (FIG. 1) between the facing ends of the cowls 4 and 7 being greater than the width or axial extent $n$ of the hub 17.

A long gear pinion 19 is machined on the right part of the shaft 13 (as viewed in FIG. 1) and this pinion is constantly meshed with a gear wheel 20 pinned on a shaft 21 which is rotatable in two bearings 22 and 23 respectively carried by arms 24 and 25 secured in the cowl 7 by screws (not shown). A bevel gear 26 pinned on the other end of the shaft 21 constantly meshes with another bevel gear 27 pinned on the bottom end of the vertical shaft 28 which is rotatable in two bearings 29 and 30. The bearing 29 is fixed in one of the fixing arms 7a for the cowl 7, this arm being bored for this purpose. The bearing 30 is fixed in a spigot 31, which is coaxial with the shaft 28 and assembled with the body 1 by the screws 8. A rotary sealing element 32 is also mounted in the spigot 31. The outer end of the shaft 28 carries, pinned thereto, a bevel gear 33 which meshes with another bevel gear 34 pinned on the shaft of a low-power electric motor 35 of the series-wound and preferably noninflammable type.

This motor is fixed to the body 1 by stays 36 and screw 37 for example. A bevel gear 38 meshing with the bevel gear 33 is pinned on the shaft of an indicator 39 having numbered drums of well-known type and preferably provided with a zero setting, this indicator acting as a revolution counter. The indicator is fixed to the body 1 by screws (not shown).

The shaft 13 comprises in the middle part thereof a recess 40 straddled by a fork 41 (FIGS. 1 and 2) formed on the end of a lever 42 which is pinned on the end of a shaft 43. The latter is rotatable in one of the arms 7b securing the cowl 7, this arm being bored for this purpose. The shaft 43 extends through a boss 1a on the body 1 to which is secured by screws (not shown) a housing 44, the shaft extending through this housing through the medium of a suitable sealing element. A collar 45 of insulating material is pinned on the end of the shaft 43 inside the housing 44. The latter is closed by a cover 46 secured to the housing by screws 47.

A resiliently yieldable metal strip 48 (FIGS. 2 and 3) is fixed to the insulating collar 45 by two screws 49 and is extended by two arms 50 and 51. The end of the arm 50 is bent in the form of a U and rubs against a metal segment 52 in the form of an arc of a circle which is fixed by screws 53 to a block of insulating material 54 secured to the bottom of the housing 44 by two screws 55.

The end of the arm 51 is also bent into the form of a

U and rubs against an electric resistance 56 which is coiled on an insulating segment 57 in the form of an arc of a circle secured to the bottom of the housing 44 by two screws 58.

The angular extent of the resistance 56 is less than that of the segment 57 and leaves bare a portion 59 of the segment 57 which is a little wider than the arm 51.

A stuffing box for the entrance of an electric cable is formed in a lateral box 60 on the housing 44.

The diagram of the electric connections is shown in FIG. 4. A conductor 61 connects one of the terminals of the motor 35 to one of the current supply line conductors 62. The other power supply line 63 is connected to the left end of the resistance 66 (see FIG. 4) by a conductor 64 and a conductor 65 connects the segment 52 to the second terminal of the motor.

The liquid meter operates in the following manner:

During the flow, liquid enters by way of the flange 2 and issues from the flange 3. It passes through the screw 40 and tends to rotate it in a given direction. At the same time, the motor 35 is fed through the conductors 61 and 65, the segment 52, the arms 50 and 51, a fraction of the resistance 56 and the conductor 64. The motor 35 drives the screw and the numbered indicator 31 through the shafts and gears described hereinbefore. If the speed of the screw is correct, that is, if the product of its number of revolutions per second multiplied by its pitch is equal to the axial speed of the liquid, the liquid speed is not disturbed and the liquid exerts no action on the screw and the metering is correct.

If the screw does not rotate quick enough, it "screws" in the liquid at a rate slower than the rate at which the latter flows, and the liquid exerts a pressure on the screw in the direction towards the right as viewed in FIG. 1. The screw moves towards the right and the lever 42 rotates in the clockwise direction, as viewed in FIG. 1. The arms 50 and 51 then turn in the direction of arrow $f_2$ (FIG. 3) and the value of the resistance 56 decreases. The motor accelerates until the correct speed is reached.

On the other hand, if the screw rotates too quickly, it "screws" in the liquid at a rate higher than that at which the liquid flows and moves towards the left and thus displaces the arms 50 and 51 in the direction of arrow $f_1$ (FIG. 3). The resistance 56 increases and the motor slows down.

When the flow stops, the arm 51 turns until it reaches the end of its travel in the direction $f_1$ and encounters the insulating part 59 and interrupts the circuit of the motor which stops.

As soon as the flow starts up again and as the screw does not rotate, it is shifted toward the right as viewed in FIG. 1 by the thrust of the liquid, the arm 51 returns in the direction of arrow $f_2$ and resumes contact with the resistance 56. The motor once more starts up.

The speed of rotation of the screw is thus constantly maintained at the exact or correct value corresponding to the flow of the liquid and the metering is correct. The screw exerts no decelerating or accelerating action on the flow of the liquid and thus creates no pressure drop.

The power of the motor 35 is very low since it merely has to supply the energy consumed by the friction in the moving parts, including the numbered roller indicator 39.

FIGS. 5 and 6 show a variant of the control of the rheostat regulating the speed of the motor to obtain more sensitivity. This embodiment is similar to the embodiment shown in FIGS. 1–4 except that the recess 40 and the direct control lever 42 are replaced by the following mechanism:

The right end of the shaft 13 extends out of the cowl 7 which is provided with an aperture 66 for this purpose. Two small discs 67 and 68 are pinned on the end of the shaft 13 outside the cowl 7. A larger disc 69 is pinned on a spindle 70 which is perpendicular to the shaft 13 so that the disc 69 is located between the two discs 67 and 68, the spacing therebetween being slightly greater than the diameter of the disc 69. The shaft 70 rotates in two bearings carried by a two-armed support 71 (FIG. 6) which is fixed to the body 1 by screws 72. Between the two arms of the support 71 a worm 73 is pinned on the spindle 70 and meshes with a worm wheel 74 carried by a shaft 75 rotatable in two bearings mounted in an extension 76 of the housing 44. The latter is identical to that described hereinbefore. The rheostat and its associated parts are also identical to those described hereinbefore.

When the screw 14 and the shaft 13 move axially in one direction or the other relative to the body 1, owing to the fact that the motor 35 rotates the screw 14 at an excessively low or excessively high velocity relative to the angular velocity, the screw should have for the linear velocity of the liquid flowing through the body 1, the disc 67 or the disc 68 comes in contact with the periphery of the disc 69 and rotates the latter by friction, thereby rotating in either direction the worm wheel 74 and consequently the arms 50 and 51 which modify the value of the resistance 56 in the suitable direction, as explained hereinbefore.

Although specific embodiments of the invention have been described, many modifications and changes may be made therein without departing from the scope of the invention as defined in the appended claims.

Having now described my invention what I claim as new and desire to secure by Letters Patent is:

1. Liquid meter comprising tubular body, a liquid flow measuring screw which is freely rotatable and movable axially in said body, an auxiliary motor located outside said body and having an output shaft and terminals for connection to a source of current outside said body, a liquid volume indicator located outside said body, a transmission connecting the output shaft to the indicator to actuate the indicator and to the screw to rotate the screw, the transmission be capable of allowing said axial movement of the screw, regulating means associated with the motor for regulating the speed of rotation of the output shaft, the regulating means having an actuating member movable within said body in one direction for increasing and in another direction for decreasing the speed of rotation of the output shaft, and means operatively connecting the actuating member to the screw so that the actuating member is responsive to said axial movement of the screw, whereby said velocity varies with variation in the linear velocity of the axial flow of said liquid, the screw tending to move in the direction of the liquid flow if the angular velocity of the screw is too low or in the direction opposed to that of said flow if the angular velocity of the screw is too high.

2. Liquid meter comprising a liquid flow measuring screw which is freely movable axially, an auxiliary electric motor operatively connected to the screw for rotating the screw at variable velocity, regulating means regulating the speed of the motor and operatively connected to the screw and responsive to the axial movement of the screw, whereby said velocity varies with variation in the linear velocity of the axial flow of said liquid, the screw tending to move in the direction of the liquid flow if the angular velocity of the screw is too low or in the direction opposed to that of said flow if the angular velocity of the screw is too high, and a liquid volume indicator operatively connected to the motor so as to be driven thereby, the screw having a shaft rotatably mounted and axially movable in two bearings, said connection between the indicator and the motor comprising a long gear pinion integral with the shaft and meshing with a gear wheel of a gear train drivingly connected to the indicator, whereby the indicator and shaft continue to be driven during axial movement of the shaft.

3. Liquid meter comprising a liquid flow measuring screw which is freely movable axially, an auxiliary motor operatively connected to the screw for rotating the screw at variable velocity, regulating means operatively connected to the screw and responsive to the axial movement of the screw, whereby said velocity varies with variation is the linear velocity of the axial flow of said liquid, the screw tending to move in the direction of the liquid flow if the angular velocity of the screw is too low or in the direction opposed to that of said flow if the angular velocity of the screw is too high, the regulating means comprising a shaft carrying said screw, a recess in the shaft, a forked lever pivotable about a fixed axis and having two branches on each side of the recess, a rheostat including a resistance and a slider cooperating with the resistance, a transverse shaft connecting the forked lever to the slider, current supply conductors connected to the motor, the resistance of the rheostat being connected in series with the motor in said conductors, whereby the position of the slider regulates the rotational velocity of the motor as a function of the angular position of the forked lever, that is, of the axial position of the shaft carrying the screw.

4. Liquid meter comprising a liquid flow measuring screw which is freely movable axially, an auxiliary electric motor operatively connected to the screw for rotating the screw at variable velocity, regulating means operatively connected to the screw and responsive to the axial movement of the screw, whereby said velocity varies with variation is the linear velocity of the axial flow of said liquid, the screw tending to move in the direction of the liquid flow if the angular velocity of the screw is too low or in the direction opposed to that of said flow if the angular velocity of the screw is too high, the regulating means comprising a shaft carrying the screw, two discs integral with the shaft, a larger disc interposed between the two discs, the two discs driving the larger disc by friction in either direction depending on the direction of the axial movement of the shaft, a rheostat having a slider and a resistance which is connected in series with the motor and the slider, and a worm speed reducer connecting the large disc to the slider.

5. Liquid meter as claimed in claim 3, further comprising an insulated portion on one end of the resistance, whereby when the slider reaches this end the electric supply of the motor is interrupted.

6. Liquid meter as claimed in claim 4, further comprising an insulated portion on one end of the resistance, whereby when the slider reaches this end the electric supply of the motor is interrupted.

References Cited
UNITED STATES PATENTS

| | | | |
|---|---|---|---|
| 2,621,516 | 12/1952 | Zavoico | 73—232 |
| 3,256,737 | 6/1966 | Sipin | 73—231 |

RICHARD C. QUEISSER, *Primary Examiner.*

JAMES J. GILL, *Examiner.*

E. GILHOOLY, *Assistant Examiner.*